April 5, 1938.   A. G. F. WALLGREN   2,113,335
BEARING
Filed Sept. 25, 1934   4 Sheets-Sheet 1

INVENTOR
August Gunnar Ferdinand Wallgren
BY
ATTORNEY

April 5, 1938.  A. G. F. WALLGREN  2,113,335
BEARING
Filed Sept. 25, 1934  4 Sheets-Sheet 2
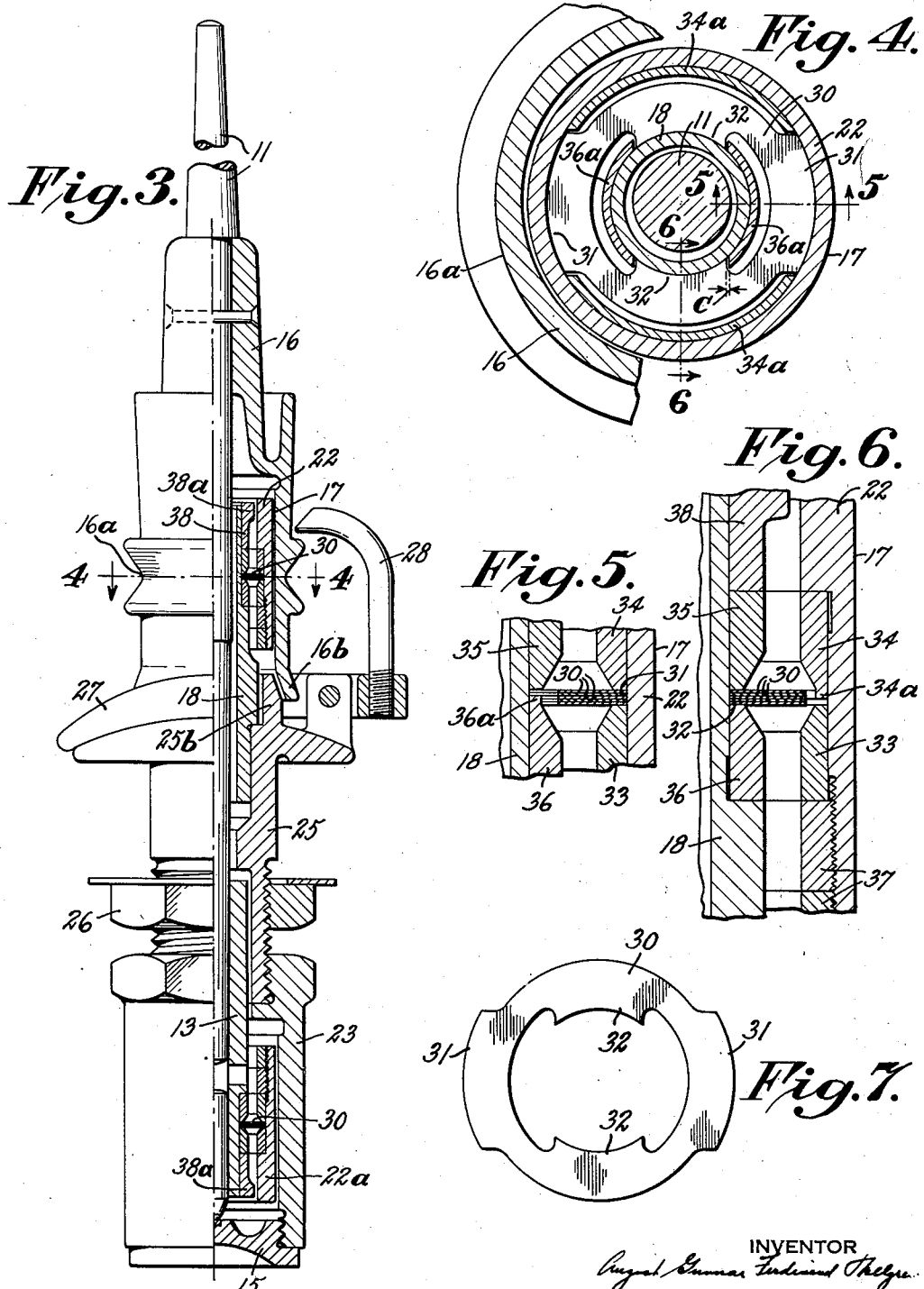

April 5, 1938.  A. G. F. WALLGREN  2,113,335
BEARING
Filed Sept. 25, 1934  4 Sheets-Sheet 3
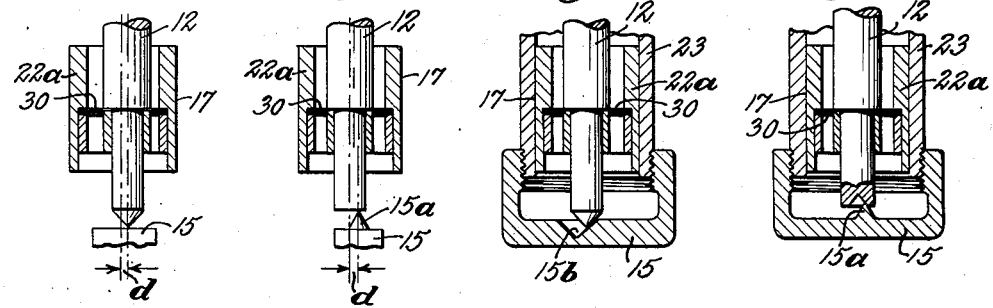
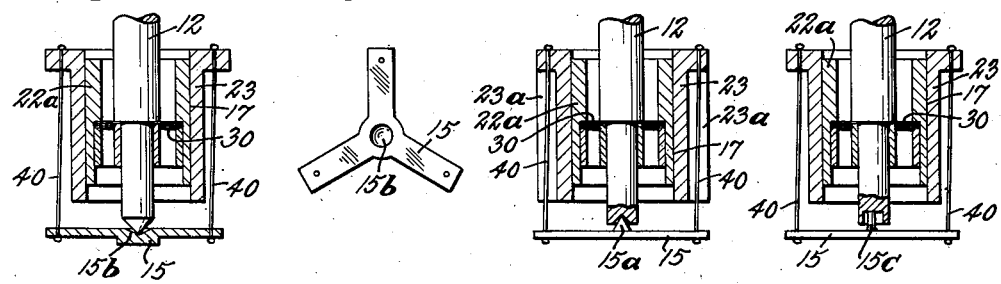
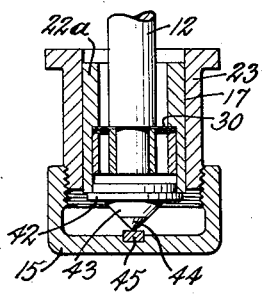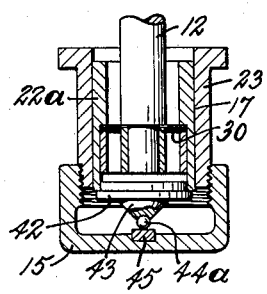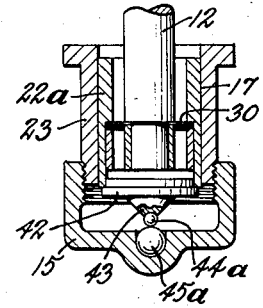
INVENTOR
August Gunnar Ferdinand Wallgren
BY
his ATTORNEY April 5, 1938.  A. G. F. WALLGREN  2,113,335
BEARING
Filed Sept. 25, 1934   4 Sheets-Sheet 4

INVENTOR
August Gunnar Ferdinand Wallgren
BY
his ATTORNEY

Patented Apr. 5, 1938

2,113,335

UNITED STATES PATENT OFFICE 2,113,335

BEARING

August Gunnar Ferdinand Wallgren, Stockholm, Sweden, assignor to Aktiebolaget Nomy, Stockholm, Sweden, a corporation of Sweden Application September 25, 1934, Serial No. 745,381
In Germany September 29, 1933

11 Claims. (Cl. 308—168)

My invention relates to bearings, and more particularly to bearings of both radial and thrust types which are arranged for lubrication by air or any other suitable gas.

The lubrication of any bearing in which sliding surfaces are employed is effected through the medium of a film of lubricant which is maintained between the surfaces by reason of the rotation of one of them. This film acts to prevent actual metal-to-metal contact between the surfaces, thereby reducing friction and wear. In a well-lubricated bearing the friction that is produced is within the lubricating film itself. The value of this friction depends upon the viscosity of the lubricant and increases with an increase in viscosity. Inasmuch as air or any other gas has a much lower viscosity than any liquid, the friction produced in an air lubricated bearing will be much less than in a bearing lubricated by oil or other liquids.

Due to the low viscosity of gas, it has heretofore been considered to be impossible to satisfactorily lubricate bearings unless the gas is fed to the bearing surfaces under comparatively high pressures. Even in these cases, the gas under pressure has not usually been employed as a lubricant in the true sense of the word, but has been used to support the major part of the load, and to thus relieve ordinary oil-lubricated bearings to this extent.

In order to satisfactorily lubricate a bearing with air under pressure which differs from that of the surrounding atmosphere only by an amount resulting from the rotation of the bearing itself, I have found that comparatively high bearing speeds are necessary. Moreover, the bearing surfaces should be accurately machined and as free as possible from scratches and the like. Also, due to the fact that no oil whatsoever is employed, the bearing surfaces must be of a material which will not rust when exposed to the moisture in the air. I have found that iron or steel with additions of nickel or chromium in compositions which permit the hardening of the material, are very satisfactory metals. Also, the bearing surfaces may be nickel or chromium plated in order to prevent rusting, or moisture resisting artificial resin, such, for example, as Bakelite, may be employed as well as cellulose products, such as Cellon.

In order that the thin air film should not be disrupted, it is important that the bearing surfaces should be in accurate alignment so as to prevent concentration of the load at one or two points. With oil lubrication, bearing alignment can be easily obtained by making the bearing surfaces spherical. However, I have found that spherical bearing surfaces for air lubrication are not satisfactory, due apparently to the fact that tendencies toward axial displacement, caused by axial thrust, which is unavoidable, concentrate the load at a limited area. In order to overcome this difficulty, I have found it best to employ cylindrical bearing surfaces for radial bearings, so that a slight axial displacement of one surface with respect to the other has no adverse effect and to allow for alignment of the surfaces by mounting one of the bearing members on a universal joint arrangement whereby it may remain in perfect alignment with the other bearing member. Such a universal joint should be perfectly free to allow universal movement of the bearing member supported thereby with a minimum amount of frictional resistance and still be capable of supporting the load in a radial direction. For thrust bearings, I have found that substantially flat surfaces are best. As is the case with radial bearings, one of the bearing members should be mounted for universal movement to allow for misalignment of the shaft.

Bearings in accordance with the present invention have been successfully applied to spindles for spinning mills. These spindles have been operated at approximately 12,000 R. P. M. continuously over a period of many months. No wear in the sliding surfaces could be ascertained, even with delicate precision instruments, and the power required to operate them was much less than with oil lubricated bearings. Likewise, the temperatures developed by the air lubricated bearings were substantially below those in oil lubricated bearings for the same purpose.

Further objects and advantages of my invention will be apparent from the following description considered in connection with the accompanying drawings which form a part of this specification and in which:

Fig. 3 is a view similar to Fig. 1, but showing a somewhat modified embodiment of my invention;

Fig. 4 is a cross-sectional view taken on the line 4—4 of Fig. 3;

Fig. 5 is a cross-sectional view taken on the line 5—5 of Fig. 4;

Fig. 6 is a cross-sectional view taken on the line 6—6 of Fig. 4;

Fig. 7 is a top view of a ring element employed in the bearing shown in Figs. 3 through 6;

Figs. 8 through 18 show various forms of thrust bearings which may advantageously be employed in the spinning spindles shown in Fig. 1 or Fig. 3;

Figure 1:
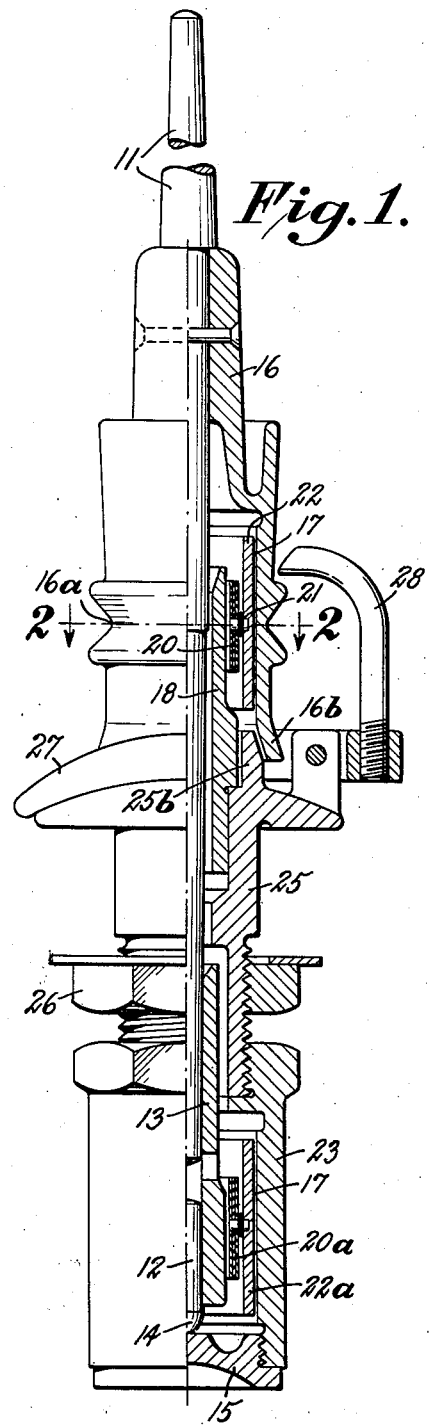
Fig. 1 is a view partly in cross-section, of a spinning spindle structure in accordance with my invention.
Figure 2:
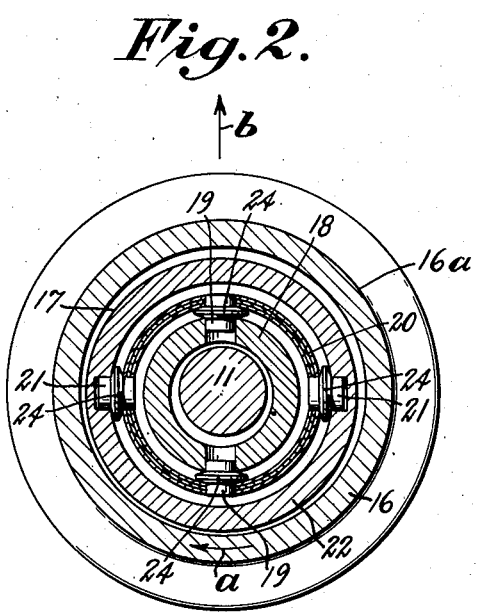
Fig. 2 is a cross-sectional view on an enlarged scale taken on the line 2—2 of Fig. 1.

Referring more particularly to Figs. 1 and 2, reference character 11 designates the upper portion of a vertical shaft of a spinning spindle. The lower portion of the shaft is designated by reference character 12, and the two portions are joined together by a bushing 13. The lower end of portion 12 is tapered, as shown at 14, to form a thrust bearing member, which turns on the thrust member 15. Rigidly secured to the upper portion 11 of the shaft by means of a rivet or the like is a pulley 16 formed with a hollow portion. The inner surface of this hollow portion is accurately machined to cylindrical form to provide the rotating member of the bearing surfaces 17. The diameter of this bearing surface is preferably made as large as the space conditions will permit, in order that it may have as high a peripheral speed as is possible. Consequently, this cylindrical surface is placed as close as possible to the bottom of the pulley groove 16a. Likewise, the center of the pulley groove is located equidistant from the ends of the bearing surface, so that the radial pull on the pulley resulting from the driving belt will be applied at the center of the surface.

In the annular space between the shaft 11 and the hollow portion of the pulley 16, there extends a stationary sleeve 18, the inner diameter of which is greater than the diameter of the shaft, so that no contact between the two takes place. Sleeve 18 is provided with diametrically opposed recesses which receive the inner ends of pins 19, as is clearly shown in Fig. 2. The outer ends of pins 19 are received in recesses formed in a Cardan ring 20. The ring 20 may comprise a single ring, or it may be made up of a plurality of concentric rings. Inasmuch as ring 20 should be somewhat resilient for purposes of assembly, it is preferable to use several concentric rings in order to provide this resiliency while giving the ring sufficient strength in radial direction. Disposed at 90° from the openings which receive pins 19, ring 20 is provided with openings which receive the inner ends of similar pins 21. The outer ends of pins 21 are received in recesses formed in a cylindrical member 22, which member forms the inner stationary bearing member. Its outer cylindrical surface is accurately machined and cooperates with the inner cylindrical surface of hollow pulley 16. Pins 19 and 21 are formed with intermediate collars 24, the purpose of which is to space the Cardan ring 20 from both the sleeve 18 and the bearing member 22 and to prevent radial play between those members.

Sleeve 18 is rigidly supported in a standard 25, which may be clamped to a bench or the like by means of a nut 26 threaded thereon. Also threaded on standard 25 is a housing 23, which encloses a lower bearing. This bearing is similar to the one described above, except that the Cardan ring 20a is located between the rotating bushing 13 and the rotating bearing member 22a instead of between the stationary sleeve 18 and the stationary bearing member 22. The inner surface of housing 23 is accurately machined to cylindrical form and provides the stationary member of the bearing surfaces 17. Thrust block 15 may be threaded into the lower end of housing 23.

An arm 27 is pivotally supported on standard 25 and is provided with a hook-shaped member 28 overhanging a portion of the pulley 16. When a bobbin is pulled off the spindle shaft 11 it may tend to pull the shaft and associated parts with it. Such movement causes the pulley to engage member 28 and causes the latter to tend to rotate arm 27 in a counter-clockwise direction, which rotation is prevented by the arm being in contact with standard 25. However, if it is desired to remove the shaft 11, arm 27 may be pivoted in a clockwise direction so as to move member 28 out of the path of the pulley.

The lower end of hollow pulley 16 is formed as an outwardly flared conical flange 16b which rotates close to a conical projection 25b formed on standard 25. The upper end of the pulley is closed by shaft 11.

The operation of the above described device is as follows:

In Fig. 2 there is shown in an exaggerated manner the relative positions of the rotating bearing surface on pulley 16 and the stationary bearing surface of member 22 during rotation of the former in the direction indicated by the arrow a, assuming the resultant radial load imposed on the shaft 11 by the pull of the cord driving the pulley and the pull of the thread being wound on the bobbin to be in the direction indicated by the arrow b. In practice, the clearance between the bearing surfaces is approximately 0.001 of an inch, the diameter of the bearing surfaces being one inch. The rapid rotation of the cylindrical surface on the pulley 16 causes air to be rotated therewith, and this air is compressed somewhat between the bearing surface on pulley 16 and that on stationary member 22 at the region where the radial load acts to bring these surfaces into contact. The result is that a thin film of air is maintained between the surfaces, this air being at a pressure above that of the surrounding air, this increase in pressure resulting solely from the rotation of the pulley 16. It will be noted that no other means whatsoever is provided for forcing air between the bearing surfaces. The operation of the bearing at the lower end of the shaft is exactly the same as that above described, except that member 22a rotates and builds up the film of air.

In the event that shaft 11 is slightly out of alignment, the bearing surface on pulley 16 will have a slight wobbling motion. If stationary bearing member 22 were rigidly fixed, this would result in concentrated bearing pressures near the ends of member 22, which would have a tendency to cause the bearing to bind and disrupt the air film. However, due to the fact that member 22 is mounted so as to have universal movement with respect to fixed sleeve 18, member 22 may participate in this wobbling motion with the result that there is no relative wobbling between the bearing surfaces. This gives an even distribution of bearing pressure and prevents the breaking down of the air film. The same is true with respect to the lower bearing, but in this case the stationary bearing surface of fixed member 23 cannot wobble, and the rotating member 22a is able to run true with respect to the stationary surface, even though the shaft wobbles, by virtue of the fact that it is mounted for universal movement with respect to the shaft. The thrust load on the shaft, resulting from its weight, as well as that of the bobbin mounted on the upper end thereof, is carried by the thrust bearing including members 14 and 15.

The lower bearing being completely enclosed, there is no opportunity for foreign matter, such as dust particles to get to the bearing surfaces. The entrance of foreign matter to the bearing surfaces of the upper bearing is prevented by the conical flange 16b on the pulley 16, which rotates close to the conical projection 25b on the standard 25. The rotation of the conical flange 16b causes air to rotate in the space between it and projection 25b with the result that any particles which tend to enter through this space are caught up by the rotating air and thrown outwardly by centrifugal force.

The embodiment shown in Figs. 3 through 7 differs from that just described only in the manner of mounting the bearing members for universal movement. Stationary sleeve 18 is formed at its upper end with a portion of reduced diameter around which clamping rings 35 and 36 are positioned. A plurality of thin discs, of the shape shown in Fig. 7, are formed with diametrically opposed inward projections 32 and diametrically opposed outward projections 31, the latter disposed at 90° with respect to the former. Projections 32 are clamped between clamping rings 35 and 36, as clearly shown in Fig. 6. Rotating bearing member 22 is provided with internal clamping rings 33 and 34, which serve to clamp between them the outward projections 31 of the discs 30. Clamping rings 33 and 34 may be retained in place by threaded lock rings 37, and clamping rings 35 and 36 may be retained in place by a locking ring 38. As shown, ring 38 is not threaded, but is forced onto sleeve 18 with a driving fit. Obviously this ring could be threaded in the manner shown in connection with lock rings 37, or the latter could be retained in place by a driving fit.

In order to prevent relative rotation between the discs 30 on the one hand and the sleeve 18 or bearing member 22 on the other, clamping rings 34 and 36 are provided with projections 34a and 36a, respectively, at the portions of their circumferences which do not engage the projections 31 and 32, respectively, on the discs 30. These projections are not as long as the total thickness of the disc bundle, because if they were they might contact rings 33 and 35, respectively, and thus prevent the clamping rings from clamping the projections on the discs. As will be seen in Figs. 5 and 6, five discs are used and the projections 36a are long enough to engage the three lower discs, while projections 34a are long enough to engage the three upper discs. In this way, the central disc is engaged by both projections 34a and 36a, while the remaining discs are engaged by only projections 34a or 36a. It will be noted from Fig. 4 that the clearance in circumferential direction between the projections 36a on the clamping ring and the projections 32 on the discs is very small, as indicated by the distance c. The same is true with respect to the projections 34a on the clamping rings and the projections 31 on the discs.

This embodiment operates in the same manner as that described in connection with Figs. 1 through 3, except that the universal movement of the bearing member 22 with respect to the fixed sleeve 18 results from the resiliency of the discs 30. Due to the fact that there is no play between any of the parts, as there is bound to be with respect to the pins 19 and 21 shown in Fig. 2, no wear can take place, and hence the universal joint arrangement cannot become loose.

The lower bearing on the spindle shown in Fig. 3 is similar to the upper one, except that the bearing member 22a carried by the discs 30 rotates with the shaft, while the outer bearing member is fixed. In this respect it is the same as the lower bearing shown in Fig. 1.

In order to avoid undue strain on the discs 30, collars 38a are provided on the inner clamping rings 38 and serve to limit the amount of universal movement between the bearing members supported by the rings and the members which support the rings.

Figs. 8 through 18 show various forms of thrust bearings which may be used in conjunction with the spinning spindles shown in either Figs. 1 or 3. In Fig. 8 the thrust bearing is formed by making the lower end of shaft 12 conical. The point of the cone rotates on the thrust member 15. As a matter of practice, it is impossible to make the parts accurately enough so that the center of the shaft 12 coincides exactly with the center of the bearing. The distance between these two center lines is shown in exaggerated form in Fig. 8 and designated by reference character d. However, inasmuch as the lower end of shaft 12 is formed as a point this point can travel in a small circle on the thrust member 15, thus allowing for inaccuracies in the alignment of the center of the shaft with respect to the center of the bearing.

After continued use the conical end of the shaft will wear a slight depression in the thrust member 15. The small particles of metal thus worn off the shaft and the thrust member will collect in this depression and act as an abrasive and thus aggravate the wear. In order to overcome this drawback the construction shown in Fig. 9 may be resorted to. As is clearly shown, the lower end of shaft 12 is flat and a conical point 15a is formed on the thrust member 15. Although the point 15a will tend to wear a depression in the end of the shaft, the small particles of metal will fall away from the wearing surfaces and hence will not act as an abrasive.

In the embodiment shown in Fig. 10 the thrust member 15 is formed with a conical recess 15b in which the conical point on the shaft 12 turns. In the case of misalignment of the shaft the conical end thereof can roll around, so to speak, the conical wall of recess 15b, as is shown in Fig. 10. This construction, however, has the same drawback as that shown in Fig. 8 and an improvement thereover is shown in Fig. 11, where the thrust member 15 is formed with a conical projection 15a and the conical recess is formed in the lower end of shaft 12. Again, with this latter construction any particles of metal which are worn away will fall out of the recess.

In Fig. 12 the thrust member 15, instead of being rigidly secured to the lower bearing housing 23, is suspended therefrom by means of wires or other flexible members 40. With this construction, the thrust member 15 is displaceable in a small circle together with the shaft if the latter is out of alignment with respect to the center of the bearing. Fig. 13 shows a top view of the thrust member 15 which is formed as an arbor with three arms and which is made as light as possible. In the modification shown in Figs. 12 and 13 the thrust member is formed with a conical recess 15b and the lower end of the shaft is formed as a conical point.

In Fig. 14 the thrust member 15 is formed with a conical projection 15a while the lower end of the shaft is formed with a conical recess for the same reasons as above pointed out. In this modification the wires 40 extend through slots or grooves 23a formed in the outer surface of bearing housing 23 and are thus protected from injury.

In the embodiment shown in Fig. 15 the lower end of shaft 12 is formed with a cylindrical recess and thrust member 15 is formed with a pin-like projection 15a which extends into the cylindrical recess in the shaft. This construction has the advantage of reducing any tendency for the shaft to vibrate in an axial direction.

In the embodiment shown in Figs. 16 to 18, the thrust member is supported by the rotating radial bearing member 22a instead of directly by the lower end of shaft 12. As is shown in all of these figures, a plate 42 with a conical portion 43 is rigidly secured to the lower end of bearing member 22a. In Fig. 16 the wearing point 44 of conical member 43 is made of an exceptionally hard material, such as wolfram-tantalum-carbide, so called Widia-metal or titanite, or the like, and turns on a block 45 of similar material held by the bearing member 15. In Fig. 17 conical portion 43 is formed with a spherical end 44a which turns on block 45. In Fig. 18 spherical end 44a turns on spherical member 45a retained in thrust member 15.

The advantage of having the thrust bearing secured rigidly to the rotary bearing member 22a, instead of forming it as a part of the shaft 12, lies in the fact that the rotary bearing member 22a and the thrust bearing can be secured together and then turned down or ground in a single operation, thus assuring perfect alignment of the axes of rotation of the two bearing members.

Figs. 19 through 23 illustrate one embodiment of an air-lubricated thrust bearing. The rotating member 46 of this bearing is rigidly secured to the radial bearing member 22a and is formed with a flat lower bearing surface. A Cardan ring 48 formed on its lower side with diametrically opposed projections 49 is retained in thrust member 15, the thrust member being formed with recesses to receive the projections. The upper side of Cardan ring 48 is formed with diametrically opposed projections 50 which are disposed at 90° with respect to projections 49. Projections 50 engage in recesses 47b formed in the lower face of stationary thrust bearing member 47. Consequently bearing member 47 may have universal movement with respect to thrust member 15. The upper bearing surface of member 47 is formed with radial slits 47a. Rotation of bearing member 46 at a high speed causes an air film to be carried along thereby, the air finding access to the bearing surfaces through slits 47a, and this film prevents direct metal-to-metal contact between the bearing surfaces. The Cardan ring support 48 allows the stationary bearing member 47 to remain in perfect alignment with the rotating member 46 even though the shaft is slightly out of alignment and wobbles.

Figure 19:
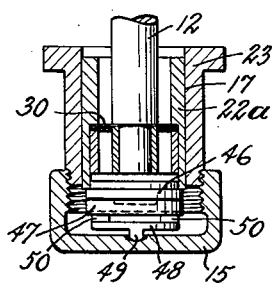
Fig. 19 is a cross-sectional view of an air lubricated thrust bearing.
Figure 24:
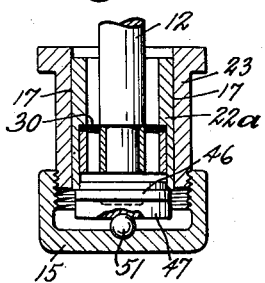
Fig. 24 is a cross-sectional view showing another embodiment of air lubricated thrust bearing.
Figure 20:
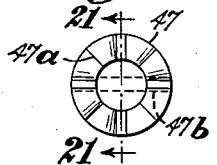
Fig. 20 is a top view of a bearing member employed in Fig. 19.
Figure 21:
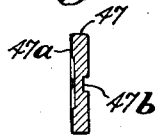
Fig. 21 is a cross-sectional view taken on the line 21—21 of Fig. 20.
Figure 22:
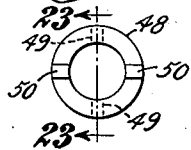
Fig. 22 is a top view of a Cardan ring employed in the bearing shown in Fig. 19.
Figure 23:
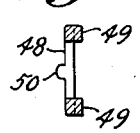
Fig. 23 is a cross-sectional view taken on the line 23—23 of Fig. 22.

The embodiment shown in Fig. 24 is the same as that shown in Fig. 19 with the exception that the Cardan ring 48 is replaced by a ball 51 which engages spherical recesses in bearing member 47 and in thrust member 15. This ball and socket type of support permits universal movement of the bearing member 47 with respect to the thrust member.

Figure 25:
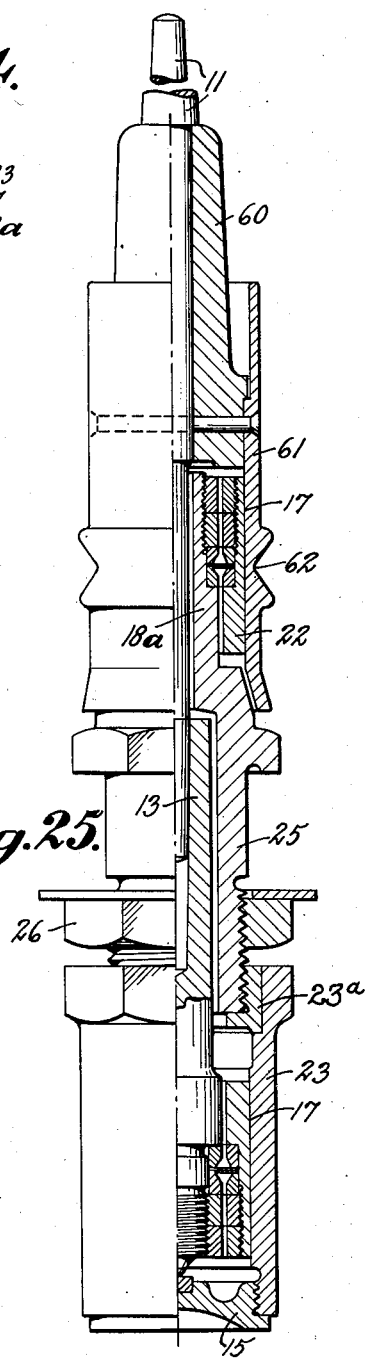
Fig. 25 is a view, similar to Figs. 1 and 3, but of a still different embodiment of my invention.

In Fig. 25 there is shown a spinning spindle which is generally similar to that shown in Fig. 1 or 3. It differs, however, in the fact that a hub 60 is secured to shaft 11 to which is riveted a pulley sleeve 61 formed with a pulley groove 62. The inner cylindrical surface of sleeve 61 is formed as a bearing surface and cooperates with the stationary bearing member 22. The forming of hub 60 and sleeve 61 as separate parts, instead of as an integral member 16, as shown in Fig. 1 or 3, makes the bearing surface more accessible for accurate machining. For the same reason the lower bearing housing 23 is not directly threaded on the standard 25 but is secured thereto by means of an intermediate sleeve 23a which is pressed or otherwise secured to the housing. Another difference resides in the fact that standard 25 is formed with an integral cylindrical portion 18a, whereas in the previous modifications this member, designated by reference character 18, was separate. The construction and mode of operation of the air-lubricated bearings shown in Fig. 25 is the same as that described in connection with Fig. 3, wherefore the description need not be repeated.

Figure 26:
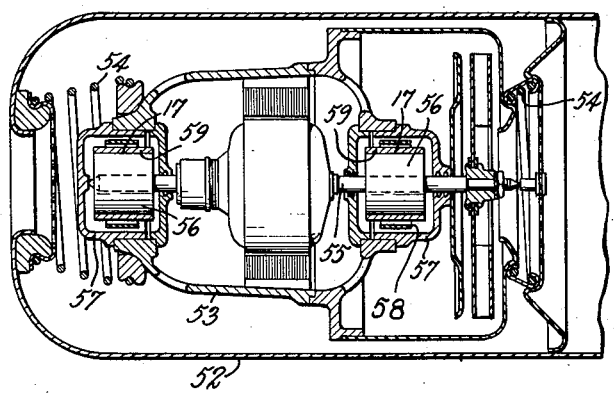
Fig. 26 is a cross-sectional view of my invention as applied to a vacuum cleaner.

Fig. 26 shows the application of air-lubricated bearings in accordance with my invention to the motor-fan unit of a vacuum cleaner. The vacuum cleaner includes an outer casing 52 within which motor-fan unit 53 is resiliently supported by means of springs 54 arranged at either end thereof. Armature shaft 55 of the motor is provided, on either side of the armature, with cylindrical rotating bearing members 56. These members are made with as large a diameter as the space limitations will permit, in order to have as high a peripheral speed as is possible. Bearing housings 57 are supported in either end of the motor housing. Stationary bearing members 59 are supported within bearing housings 57 by means of a Cardan ring or the like 58 which, as illustrated, is similar to that shown in Figs. 1 and 2. However, any other suitable means for obtaining universal movement may be employed.

In operation, the bearing members 56 rotate with high peripheral speed and carry with them a thin film of air which is maintained between the outer bearing surfaces of members 56 and the inner bearing surfaces of members 59, thus preventing direct metal-to-metal contact between them. In the event that the shaft is slightly out of alignment, thus causing bearing members 56 to wobble slightly with the shaft, stationary bearing members 59 are able to participate in this wobbling movement by virtue of the Cardan ring 58. Thus, there is no relative wobbling between the bearing surfaces and the air film is maintained.

While I have shown and described air-lubricated bearings in accordance with my invention as applied to two more or less specific devices, it is to be understood that this has been done for purposes of illustration only and that the bearing may be applied to many other purposes. Also throughout the specification I have referred to air as a lubricant. It will be appreciated that any gas which does not have injurious effect upon materials of the bearings may be used instead of air. Finally, my invention is to be limited only by the appended claims viewed in the light of the prior art.

What I claim is:

1. A gas-lubricated bearing for sustaining the axial load on a shaft including a disc-shaped bearing member having radial grooves formed in the bearing surface thereof, means for securing said bearing member to said shaft, a bearing support, a second disc-shaped bearing member, and means for connecting said second bearing member to said support, one of said means including a universal joint, said bearing members being arranged to be lubricated by a gas at a pressure which differs from that of the surrounding gas pressure by an amount resulting from the rotation of the first mentioned bearing member.

2. In a bearing for relatively rotatable elements, a first bearing member, means for connecting said member to one of said elements, said means including a Cardan ring comprising a plurality of resilient rings and having a pair of diametrically opposed projections on one side and another pair of diametrically opposed projections on the other side and disposed at 90° from the first pair and means for retaining one of said pairs of projections with respect to said element and for retaining the other of said pairs with respect to said member, and a second bearing member connected to the other of said elements.

3. In a bearing for relatively rotatable elements, a first bearing member, means for connecting said member to one of said elements, said means including a plurality of circular concentric resilient rings formed with recesses disposed 90° apart around the circumference, a pair of pins extending inwardly from diametrically opposed recesses and a pair of pins extending outwardly from the other recesses, said element being formed with recesses to receive one of said pairs of pins and said member being formed with recesses to receive the other pair, and a second bearing member connected to the other of said elements.

4. In a bearing for relatively rotatable elements, a first bearing member, means for connecting said member to one of said elements, said means including a resilient circular disc having a pair of diametrically opposed outward projections and a pair of diametrically opposed inward projections disposed at 90° to said outward projections, means for securing one of said pairs of projections to said element and means for securing the other pair to said member, and a second bearing member connected to the other of said elements.

5. In a bearing for relatively rotatable elements, a first bearing member, means for connecting said member to one of said elements, said means including a plurality of resilient circular discs, each disc having a pair of diametrically opposed outward projections and a pair of diametrically opposed inward projections disposed at 90° to said outward projections, similar projections on said discs being in alignment, means for clamping one of the pairs of aligned projections to said element and means for clamping the other pairs to said member, and a second bearing member connected to the other of said elements.

6. In a bearing for relatively rotatable elements, a first bearing member, means for connecting said member to one of said elements, said means including a plurality of resilient circular discs, each disc having a pair of diametrically opposed outward projections and a pair of diametrically opposed inward projections disposed at 90° to said outward projections, similar projections on said discs being in alignment, means for clamping one of the pairs of aligned projections to said element and means for clamping the other pairs to said member, additional means for preventing relative rotation between said discs and said element and member, and a second bearing member connected to the other of said elements.

7. In a bearing for relatively rotatable elements, a first bearing member, means for connecting said member to one of said elements, said means including a plurality of resilient circular discs, each disc having a pair of diametrically opposed outward projections and a pair of diametrically opposed inward projections disposed at 90° to said outward projections, similar projections on said discs being in alignment, means for clamping one of the pairs of aligned projections to said element and means for clamping the other pairs to said member, stop means for limiting the universal movement possible between said element and said member, and a second bearing member connected to the other of said elements.

8. In a device of the class described, a rotatable shaft, a stationary bearing support, a radial bearing including a cylindrical bearing member secured to said bearing support, a second cylindrical bearing member, universal joint means for securing said second member to said shaft so as to maintain said second member in parallel alignment with said first member, said bearing members being arranged to be lubricated by air at a pressure which differs from atmospheric pressure by an amount resulting only from the rotation of the bearing, and a thrust bearing including a stationary thrust bearing element and flexible members for suspending said thrust bearing element from said bearing support.

9. A spinning mill spindle including a vertical shaft, a stationary support having a cylindrical portion surrounding and spaced from said shaft, a first cylindrical bearing member supported on the outside of said cylindrical portion, a hollow pulley secured to said shaft and having a portion surrounding said first bearing member, the interior of said portion of said pulley being formed as a cylindrical bearing surface cooperating with the bearing surface of said first bearing member, said bearing surfaces being arranged to be held out of metal-to-metal contact during rotation by a film of air maintained therebetween by the rotation of said second bearing member, and a conical part on said stationary support, said hollow pulley being closed at one end and formed with a conical opening at the other positioned so as to rotate in proximity to said conical part, whereby foreign matter is excluded from said bearing member.

10. In a gas-lubricated bearing for relatively rotatable elements, a first bearing member, means for connecting said member to one of said elements, said means including a flat circular disc of resilient material having a radial extent many times greater than its thickness whereby the disc is substantially rigid with respect to loads acting in a radial plane while being resiliently yieldable to forces acting in other planes, means for securing said disc at diametrically opposed points to said element, means for securing said disc to said member at diametrically opposed points disposed at 90° from the first mentioned points, and a second bearing member connected to the other of said elements, said bearing members being arranged to be separated during rotation by a film of gas maintained therebetween by rotation of one of said members.

11. In a bearing for relatively rotatable elements, a first bearing member, a resilient annular disc for connecting said member to one of said elements, means for securing a portion of one of the peripheries of said annular disc to said element, means for securing a portion of the other periphery of said annular disc to said bearing member, and a second bearing member connected to the other of said elements.

AUGUST GUNNAR FERDINAND WALLGREN.